2,795,659

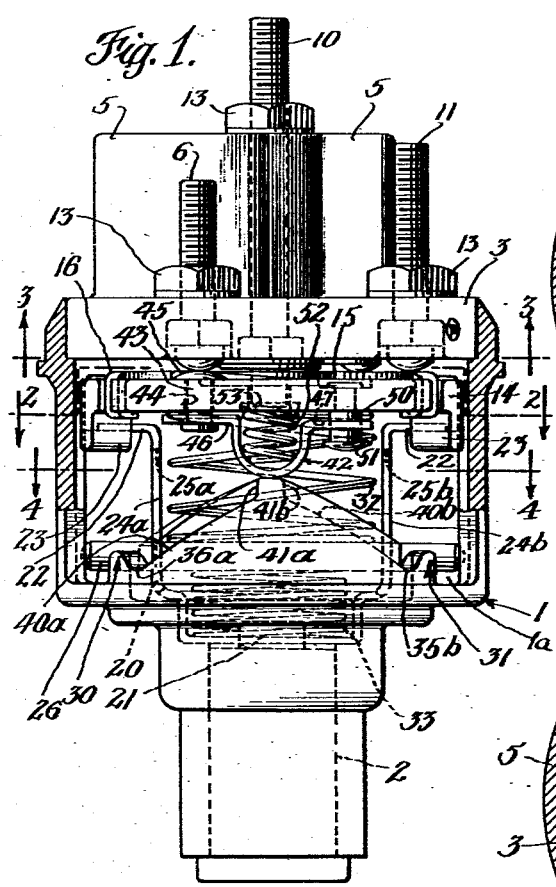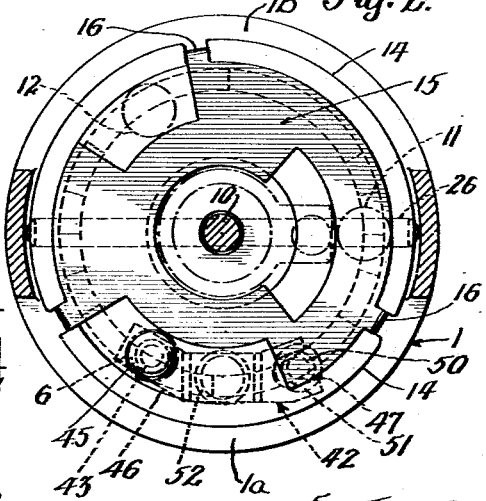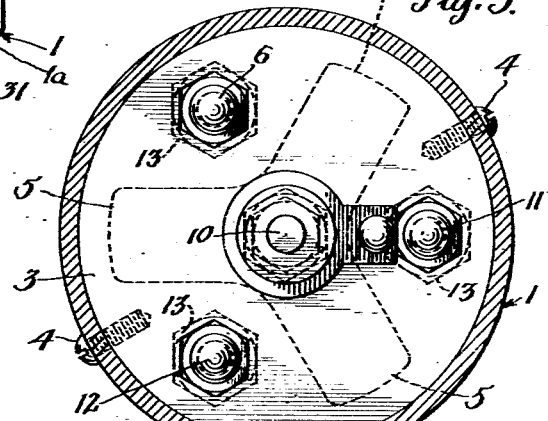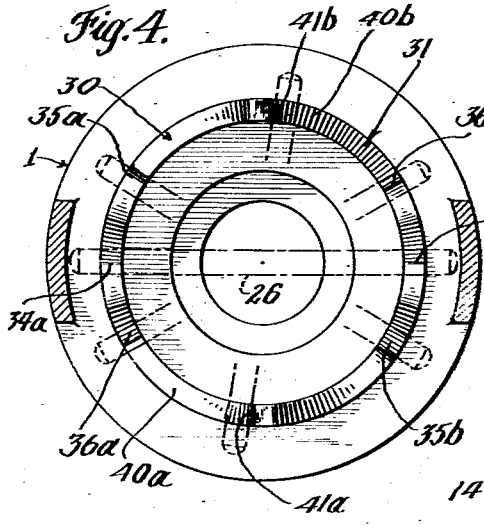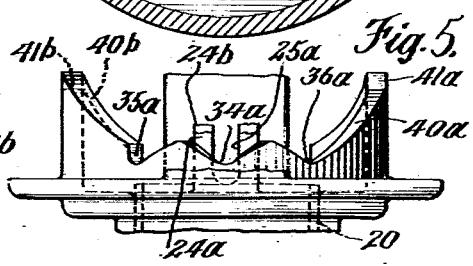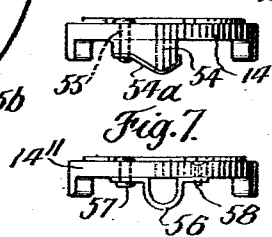
INVENTOR
Walter W. Miller
William Edward Berk Jr.
BY
Synnestvedt & Lechner
ATTORNEYS

United States Patent Office 2,795,659
Patented June 11, 1957

VEHICLE THEFT-PREVENTING MEANS

Walter W. Miller, Abington Township, Montgomery County, Pa., and William Edward Berk, Jr., Detroit, Mich., assignors to United Specialties Company, Philadelphia, Pa., a corporation of Delaware Application April 4, 1955, Serial No. 498,980

7 Claims. (Cl. 200—6)

This invention relates in general to switch mechanism of the type to selectively energize a plurality of circuits and, in particular, relates to means which is effective in a certain condition of the switch to prevent the energizing of at least one of the connected circuits.

The invention will be described in connection with an automobile ignition switch incorporating means to prevent the unauthorized starting of the engine by the external interconnection of the ignition and battery terminals.

Ignition switches of the kind in question ordinarily have a housing which is attached to the dashboard of the vehicle, a base in the housing carrying a plurality of fixed terminals which have connections with at least the battery and ignition circuits, and a movable switching member (actuated by the vehicle ignition key) which, when in one position, interconnects the battery and ignition terminals and, when in an "off" position, disconnects these terminals. In this type of an arrangement it will be apparent that even though the switch is in the "off" position, an external strap or a jumper connected between the ignition and battery terminals on the switch can serve as a means for starting. Thus, the vehicle is subject to theft.

The present invention overcomes the above by providing for the grounding of the ignition terminal or circuit when the switch is in the "off" position so that a jumper between the battery terminal and the ignition terminal on the switch would short-circuit the battery and preclude the energizing of the ignition circuit. This is accomplished by providing means on the movable switching member which interconnects the ignition terminal with the switch casing (hence ground) on the "off" position.

One object of the invention is to provide in an automobile ignition switch having a movable switching member, ignition terminal grounding means comprising mechanism on the switching member operative to interconnect the ignition terminal with ground in the "off" position of the switch.

Another object of the invention is to provide in an automobile ignition switch having a movable switching member, ignition terminal grounding means comprising a spring-like contact mounted on the switching member adapted to interconnect the ignition terminal and the switch casing in the "off" position of the switch.

Another object of the invention is to provide in an automobile starter ignition-type of switch having a switching member, movable to a plurality of positions defined by a cam and a cam track, ignition terminal grounding means comprising a contact mounted on the switching member and adapted to interconnect the ignition terminal and a portion of the cam track in the "off" position of the switch.

The details of construction of the invention will be apparent from the following description and drawings wherein:

Figure 1 is an elevational view partially in section showing the movable switching member in the "off" position and with the grounding contact thereon interconnecting the ignition terminal with a portion of the cam track;

Figure 2 is a plan section on the line 2—2 of Figure 1 and showing in particular a portion of the grounding contact which engages the ignition terminal on the "off" position of the switch;

Figure 3 is a sectional view taken as indicated by the line 3—3 of Figure 1 and showing in particular the arrangement of the fixed contacts of the switch;

Figure 4 is a plan section of the housing taken on the line 4—4 of Figure 1 and showing in particular the cam track and the disposition of the cam for various switch positions;

Figure 5 is a fragmentary side elevation view of the cam track; and

Figures 6 and 7 illustrate alternative arrangements for mounting the grounding contact on the movable switching member.

A type of ignition switch to which the invention has been applied is disclosed in the Patent 2,679,557, issued May 25, 1954, to Walter W. Miller and assigned to the assignee of the present invention.

In Figure 1 the numeral 1 designates the casing or housing of a starter ignition switch. The side of the housing has been cut out at 1a and 1b in order to more clearly illustrate the mechanism inside. Ordinarily the side of the housing is closed. On the front end of the housing is the usual lock cylinder 2, into which the ignition key is inserted by the operator of the vehicle. At the rear of the housing is a base 3 which may be secured in the housing as by the screws 4—4 shown in Figure 3, or the outer edge of the housing may be staked over to hold the base. The base has rearwardly extending portions 5—5. As seen in Figures 1 and 3, the base carries a plurality of fixed terminals, the ignition terminal being generally designated by the numeral 6, the starter terminal by the numeral 10, the accessory terminal by the numeral 11, and the battery terminal by the numeral 12. As will be apparent from Figure 1, the terminals extend through the base 3 and on the outside are threaded and have the securing nuts 13—13. On the inside of the base, each terminal is respectively provided with a boss, as is shown in Figure 3.

Inside of the housing is a switching member comprising a disk 14 made of insulating material and carrying a switch plate 15 made of conducting material and connected to the disk by the lugs or fingers 16—16. As seen in Figure 1, the switch plate engages the bosses on the fixed terminals. The disk and plate are adapted to be rotated and this causes the circuits connected to the accessory, ignition and starter terminals to be selectively interconnected to the battery terminal. The interconnection is accomplished by the disposition of the fixed terminals and the shape of the switch plate 15. The details of the switching operation are disclosed in the above-mentioned patent and need not be further commented on here.

The disk 14 is adapted to be rotated by a driver 20 which is connected at 21 to the lock cylinder 2, turned by the operator manipulating the ignition key. The driver has radially projecting lugs 22—22 which are disposed in axially extending slots formed in the portions 23—23 of the disk. This arrangement provides for driving engagement between the driver and the disk and also provides for these two elements to be slightly movable axially with respect to one another.

The legs 24a and 24b of the driver have axially extending slots 25a and 25b, in which is disposed a pin or cam 26. The outer ends of the cam bear on cam tracks 30 and 31 which will be described shortly. A spring 32 bears between the disk 14 and the cam 26 and pushes the switch plate 15 into engagement with the bosses on the fixed terminals and also pushes the cam into engagement with the cam tracks. Another spring 33 bears between the cam 26 and the bottom of the driver 20 and keeps the driver firm against the lock cylinder.

The cam 26 and cam tracks 30 and 31 operate to properly position the switch plate 15 with respect to the fixed terminals for the various settings of the switch. As the driver is rotated, the cam 26 is moved and settles in one or the other depressions in the track. For example, as seen in Figures 4 and 5, when the cam is in the center depressions 34a and 34b, the switch is in the "off" position; when the cam is in the depressions 35a and 35b, the switch is in the "accessory" position; and when the cam is in the depressions 36a and 36b, the switch is in the "ignition" position. The movement of the cam over the track is provided for, of course, by the slots 25a and 25b and the action of springs 32 and 33.

When the driver is rotated so that the cam rides up the ways 40a and 40b to engage the abutments 41a and 41b, the switch is in the "start" position. If the key and the lock cylinder are then released, the spring 32 will cause the cam to slide down the ways back to the "ignition" position.

The manner in which the ignition terminal of the above-described switch is adapted to be grounded on the "off" position will next be described.

In Figure 1 the grounding contact is generally indicated by the numeral 42 and has an end portion 43 extending through an aperture 44 in the disk 14. On the outer face of the disk, the end portion has a boss 45 which engages the boss on the ignition terminal 6. On the inner side of the disk, the end portion fixedly carries one side of a generally U-shaped strip 46. The other side of the strip is slotted at 47 and slidably engages a guide or positioning post 50 which is fixedly secured to the disk. The outer end of the post carries an abutment ledge 51. Between the disk and the strip is a spring 52, which preferably is mounted in a recess 53 in the disk. As seen in Figure 2, the strip 46 is somewhat arcuate in shape so as to conform to the shape of the disk.

In the position of the switch as shown in Figure 1, (which is the "off" position), the strip 46 is engaged with the top of the abutment 41a on the cam track 30, and it will be apparent that an electrical connection is made from the ignition terminal 6 through the grounding contact 42 to the abutment 41a. Since the switch housing is grounded to the frame of the vehicle, the ignition terminal 6 is also grounded.

If the switch is moved into the "accessory" position, the grounding contact moves toward the left (as viewed in Figure 1) and away from the abutment 41a. The spring 52 forces the U-shaped strip downwardly until the end of the strip engages the abutment 51 on the post 50. The aperture 44 in the disk is somewhat oversized, which allows a slight pivoting of the end portion 43 to accommodate the effect of the spring moving the strip away from the disk. In the "accessory" position, the strip 46 does not contact any part of the casing or cam track, nor does the boss 45 contact any of the fixed terminals on the base 3.

If the switch is then moved back to the "off" position, the strip 46 contacts and rides over the abutment 41a to its position as above described.

If the switch is moved from the "off" position to the "ignition" or the "start" positions, the grounding contact operates in a manner similar to that described for the "accessory" position.

The above-described arrangement is preferred because the action of the spring 52 allows the strip to ride freely over the abutment; hence, the frictional forces developed are at a minimum and there is little wearing of parts. Furthermore, the strip 46 can be made of heavy gauge metal so as to easily withstand short-circuit currents without annealing. In addition, the free riding spring action and the pivoting in the aperture 44 imposes little load on the disk; hence, there is no tendency for the disk to be tipped or canted in the "off" position.

While the above arrangement is preferred, we have shown in Figures 6 and 7 alternative arrangements which may be used. In Figure 6 the disk 14' is provided with an extension 54 and over the extension is formed a strip 54a which is secured to the disk as by the rivet 55. In Figure 7 the disk 14" has a U-shaped strip 56 which may be connected to the disk as by rivets 57 and 58, or alternatively, the rivet 58 may serve as a guide or positioner and thus provide for some flexing of the strip 56.

We claim:

1. A switch mechanism comprising: a housing including a metal grounding lug on the inside thereof; a base mounted on said housing and carrying a plurality of fixed terminals; movable means including a switch plate mounted in said housing and adapted to be moved relative to said base whereby to selectively interconnect said fixed terminals in a predetermined manner; and contact means carried by said movable means and electrically insulated from said switch plate and adapted at a predetermined position of said movable means to engage said lug and one of said fixed terminals and electrically interconnect the same whereby to provide for the grounding of the terminal.

2. A switch mechanism comprising: a housing carrying a cam track; a base mounted on said housing carrying a plurality of fixed terminals; rotatable means mounted in said housing; a cam carried by said rotatable means and adapted to cooperate with said track; and contact means mounted on said rotatable means and adapted to electrically interconnect one of said fixed terminals with a portion of said cam track at a predetermined position of said rotatable means.

3. A switch mechanism comprising: a housing carrying a cam track having detents corresponding to an "off" position, an "accessory" position, an "ignition" position and a "starter" position of the switch; a base mounted on said casing and carrying a plurality of fixed terminals including an ignition terminal; rotatable means including a contact mounted in said casing and adapted to be selectively movable to any of said switch positions whereby the contacts interconnect said fixed terminals in a predetermined manner; and contact means mounted on said rotatable means and adapted to engage said ignition terminal and a portion of said track adjacent the detent corresponding to said "starter" position when said rotatable means is in the "off" position.

4. For an ignition switch, the subcombination comprising: a disk-like member made of insulating material; contact means mounted on one face of said disk; and a grounding contact mounted on the other face of the disk and having a portion extending through the disk and terminating on said one face.

5. A construction in accordance with claim 4 wherein said grounding contact is resiliently mounted for movement toward and away from said disk.

6. A construction in accordance with claim 4 wherein said grounding contact is non-movable with respect to said disk.

7. For an ignition switch, the subcombination comprising: a disk-like member made of insulating material; an aperture in said disk extending between the opposite faces thereof; a grounding contact including a portion extending through said aperture and terminating adjacent one face of the disk and a generally U-shaped portion disposed on the opposite face of the disk, the portion extending through the aperture being constructed whereby the grounding contact is movable toward and away from the disk; a spring interposed between the U-shaped portion and the disk; and means limiting said outward movement and positioning the contact in a predetermined manner.

References Cited in the file of this patent

UNITED STATES PATENTS 2,502,952    Jacobi ---------------- Apr. 4, 1950